United States Patent [19]

Macken

[11] Patent Number: 4,458,133

[45] Date of Patent: Jul. 3, 1984

[54] METHOD AND APPARATUS FOR LASER ENGRAVING OF SMOKE-SENSITIVE MATERIALS

[76] Inventor: John A. Macken, P.O. Box 696, Santa Rosa, Calif. 95402

[21] Appl. No.: 371,536

[22] Filed: Apr. 26, 1982

[51] Int. Cl.³ .............................................. B23K 27/00
[52] U.S. Cl. .............................. 219/121 LG; 83/565;
83/925 CC; 219/121 LN
[58] Field of Search .................. 219/121 LG, 121 LN;
83/925 CC, 451, 29, 565

[56] References Cited

U.S. PATENT DOCUMENTS 3,931,491  1/1976  Stumpf .................... 219/121 LV X
4,362,077 12/1982  Gerber ................................ 269/8

FOREIGN PATENT DOCUMENTS 447072  9/1976  U.S.S.R. .......................... 83/925 CC

Primary Examiner—C. L. Albritton
Attorney, Agent, or Firm—Edward E. Roberts

[57] ABSTRACT

A laser apparatus for use in laser cutting of a plurality of sheets of smoke-sensitive, heat-sensitive material in aligned stacked relation, the apparatus including a base member assembly for producing a magnetic field and for supporting the stack with a template formed of a generally rigid, magnetic material, the pull of the magnetic field on the template urging adjacent sheets into intimate surface contact to substantially eliminate voids therebetween during the cutting process. The template is preferably plated or coated with a reflective substance such as chromium, and the magnetic field may be created by an array of permanent magnets on a magnetic sheet.

15 Claims, 3 Drawing Figures

METHOD AND APPARATUS FOR LASER ENGRAVING OF SMOKE-SENSITIVE MATERIALS

BACKGROUND OF THE INVENTION

The background of the invention will be discussed in two parts;

1. Field of the Invention

This invention relates to laser apparatus and methods, and more particularly to a method and apparatus for engraving smoke-sensitive materials, such as paper, cloth and the like.

2. Description of the Prior Art

Laser engraving or cutting of items such as wood is well known to those skilled in the art. When wood items are engraved, normally a template made of brass is placed over the item, the template having openings therein in the form of the image or pattern to be engraved on the surface of the wood. The pattern is formed by chemical etching to remove the brass in the area desired. The template is provided with a peripheral frame which fits snugly about the wood item with the template in abutting relation with the surface to be etched or engraved by the laser beam. The laser beam, properly focused, is then scanned over the combination of the template and wood in some overlapping pattern so that there is relatively uniform coverage of the open areas in the brass template.

In such apparatus, it is usual to use a carbon dioxide laser having a power output in excess of 100 watts, with the beam being focused to a spot size intense enough to vaporize the wood to a given depth. Usually, power densities in excess of 30,000 watts per square centimeter are reached at or near the focus of the laser beam so that the wood can be cleanly vaporized. When vaporization occurs, the wood vapors escape from the part at high velocity. However, there is still condensation of these vaporized wood by-products on the surface of the wood and on the template. Usually, air flow prevents condensation of these vaporized wood by-products from taking place on the focusing lens or optics of the laser apparatus. When wooden items are engraved, the condensed vaporized wood by-products, or condensed smoke, can be cleaned from the wood item and from the template after the engraving is complete.

However, the above-described process and apparatus is not readily usable with thin, flexible, smoke-sensitive materials, such as paper and cloth, particularly where the laser is used to cut through the thin material, and more especially so when multiple sheets of the material are stacked to cut through several sheets or layers simultaneously.

For example, if multiple sheets of paper are stacked, and placed below a standard brass template and scanned with a laser beam several undesirable phenomena occur due to the smoke-sensitive and thermal-sensitive nature of the work piece. During the cutting process, the vaporized paper residue condenses on both sides of the paper along the cut edge, this deposit occurring on every sheet in the stack. This deposit has a brown tarnishing appearance and is somewhat sticky. In addition, this sticky residue deposits itself on the undersurface of the template, causing adherence of the top sheet of paper to the template adjacent the cut edge. It is uneconomical to remove the deposit from the sheets of paper, thus rendering this process unsuitable for cutting paper in stacked layers. In addition, with stacked sheets of paper, the paper near the top of the stack goes through dimensional changes as the lower sheets are cut due to the intense heat involved. Due to these thermal effects, and the dimensional changes, there is movement of the upper sheets of paper, which causes the openings formed therein to increase in size to the extent that many fine lines, which are intended to be left as strips of paper, are in fact, eliminated.

It is an object of the present invention to provide a new and improved apparatus and method for laser cutting of paper, or similar thin smoke-sensitive material.

It is another object of the present invention to provide a new and improved method and apparatus for laser cutting of a stack of sheets of material, such as paper or the like.

It is still another object of the present invention to provide a new and improved process and apparatus for laser cutting of cloth of different compositions.

SUMMARY OF THE INVENTION

The foregoing and other objects of the invention are accomplished by providing a template formed of a generally rigid magnetic material for placing over sheets of material to be cut with a base plate therebelow, in general alignment with the template. The base plate includes means for providing a magnetic field for attracting the template toward the base plate to apply pressure to the sheets of material stacked therebetween. In the preferred embodiment, the template is formed of steel with both sides thereof coated with chromium. The base plate is an assembly having a generally rigid, non-magnetic sheet, or plate, of brass, or the like, for abuttingly engaging the lower surface of the stack of material, with a sandwich layer of ceramic magnets therebeneath, the magnets being positioned with alternating polarities on a base plate member of a suitable magnetic material, such as galvanized steel.

The selection of magnets and magnetic as well as non-magnetic materials, as well as the dimensions thereof, and selected for providing a generally uniform pressure over all areas of the template in contact with the upper surface of the first sheet of material.

For laser cutting of materials, such as cloth, adjacent layers are provided with intervening materials, or, the intervening layers may be the same material with a different thread orientation, depending on the result desired.

Other objects, features and advantages of the invention will become apparent from a reading of the specification, when taken in conjunction with the drawings, in which like reference numerals refer to like elemenets in the several views.

DESCRIPTION OF THE PREFERRED EMBODIMENT

As heretofore discussed, the use of a brass template for laser cutting or engraving of a stack of sheets of material having pliable, thermal-sensitive as well as smoke-sensitive characteristics is not economically feasible. The present invention contemplates the application of pressure to the stack in order to avoid dimensional changes during laser cutting, as well as to avoid residue deposits from the combustion by-products. This application of pressure, as will hereinafter be described, is by the use of magnetism, or electromagnetism, for creating a magnetic field which clamps the opposing surfaces of the stack into close relation under the force of the magnetic clamp or "vise".

The apparatus and method to be described has application with numerous types of sheet materials, of different thicknesses, and densities, with certain parameters being adjusted to accommodate the material used. For example, certain cloths, such as polyester thread woven cloths, have a grain structure, as well as fusible characteristics. Cloths made of natural fibers, such as cotton and silk, do not exhibit the tendency to "weld" or fuse together along the laser cut. Methods, taking into consideration these characteristics, will be discussed.

Figure 1:
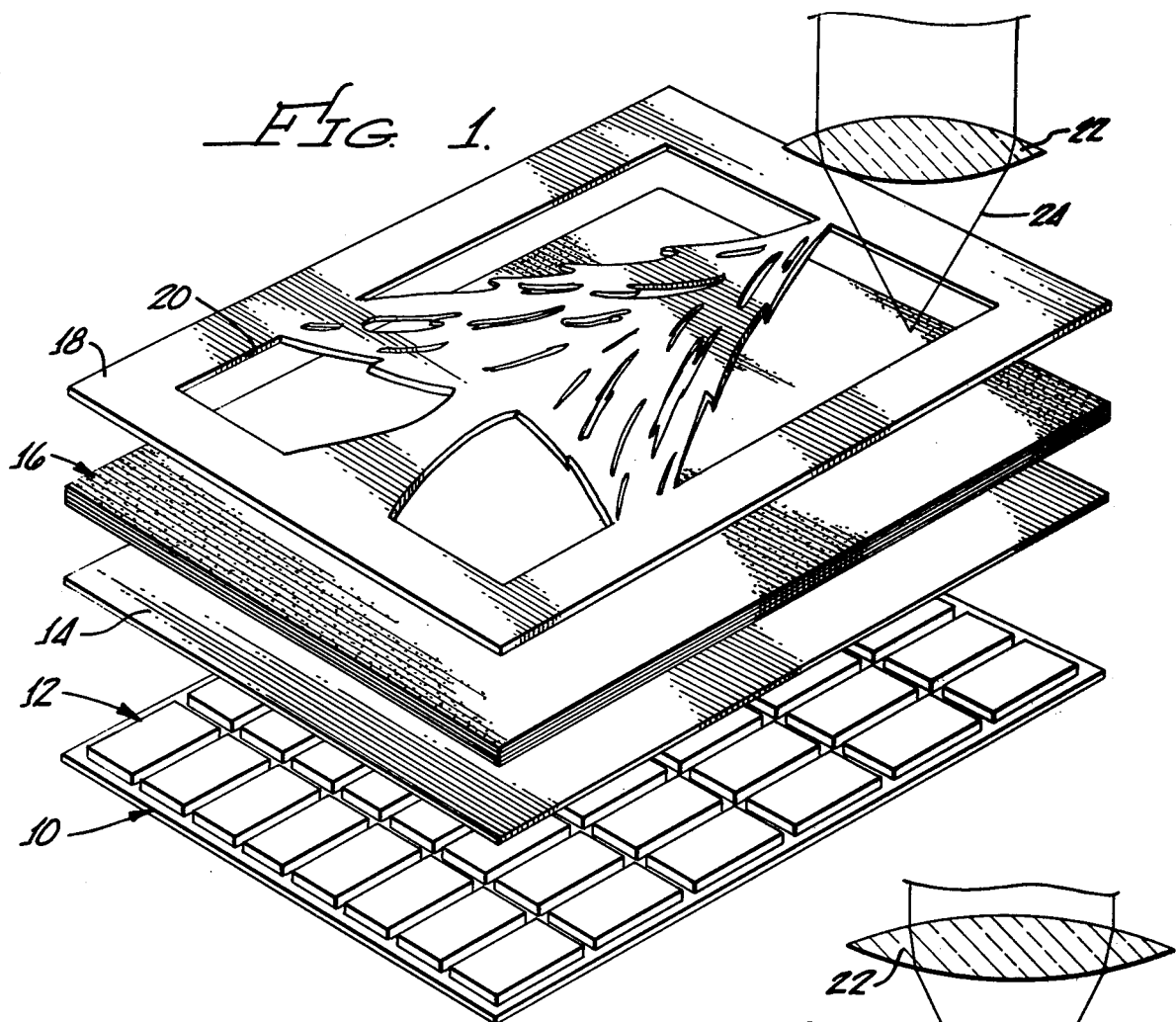
FIG. 1 is an exploded perspective view of the apparatus according to the invention with the stack of material depicted in its operative position.
Figure 2:
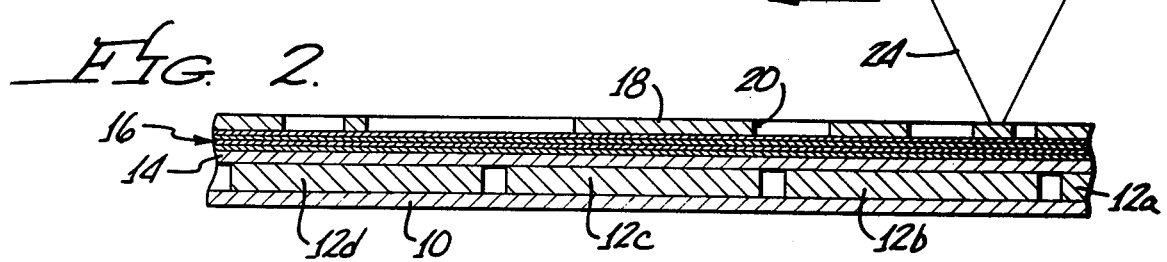
FIG. 2 is an end view of the apparatus and material of FIG. 1 showing the relation therebetween in the assembled state ready for engraving.

Referring now to the drawings, and more particularly to FIGS. 1 and 2, there is shown a base, or support plate 10 of a generally rectangular, planar configuration, having suitably mounted on the surface thereof, a matrix or array of magnets 12. A second base or support plate 14, configured, dimensionally, generally identical to the plate 10, overlies the matrix of magnets 12. The plate 14 serves to support a stack 16 of the sheets of material to be cut. Overlying the top sheet of material in the stack 16 is the template 18 having openings 20 formed therein, in the image or pattern desired for cutting in the stack 16.

A source of laser energy (not shown) is focused through a lens 22 to provide a focused laser beam 24 which scans the template 18 in any convenient manner, such as an overlapping raster scan to provide the desired cut in the stack 16. Scanning of the laser beam can be accomplished by movement of laser optics (22) or movement of the work (10,12,14,16,18,20) or both.

The discussion thus far has proceeded with reference to the mechanical layout of the assembly, without reference to details. The plate 10 has several requirements. Initially, it should be made of a magnetic material, and secondly, it must be sufficiently rigid for the intended purpose, or provided with a rigid backing. In the embodiment illustrated, the plate 10 is formed from a galvanized steel of 0.03 to 0.07 inches thick. The individual magnets 12a, 12b, 12c, etc. are made of ceramic magnet material with a residual inductance rating of 3.8 kilogauss, with dimensions of 1.7 inch square by 0.18 inch thick. The magnets 12a, 12b, etc. have the magnetic pole orientation in the 0.18 inch dimension, that is, the poles are perpendicular to the plane of the galvanized plate 10. Each magnet 12 is placed on the galvanized plate 10 with the polarity of adjacent magnets reversed. The array of magnets 12, positioned in an abutting relation to form a layer, produce a fringing magnetic field at a distance between 0.03 inch and 0.30 inch above the upper surface of the layer or array.

The second plate 14 in the embodiment described is a layer or sheet of a non-magnetic material, such as a sheet of brass having a thickness of 0.010 inch. This plate is not absolutely essential, but serves to smooth out any irregularities caused by the upper surfaces of the array of magnets 12. Alternatively, the magnets 12 may be encapsulated, potted, or covered with a surface coating to provide a smooth upper surface on which the stack 16 of sheets of material is positioned. This coating, or brass plate 14, if used, additionally assists in protecting the paper or other material to be cut from any surface debris from the magnets 12, most commonly, a form of "soot" (with permanent ceramic magnets). While it is not necessary to have the plate 14 made of brass, the plate (or coating) is desirably formed of some nonmagnetic material or composition which will not attenuate the magnetic field, and of a thickness sufficiently small to still provide the desired magnetic force at the desired height above the surface consistent with the height of the stack 16 being engraved or cut.

To complete the assembly, the template 18 is formed of a suitable magnetic material of sufficient rigidity and thickness to exert the required pressure on the stack 16 without deformation. The principle of the present invention is to exert sufficient pressure on the stack 16, which must be substantial and generally uniform over the paper everywhere that the template 18 comes into contact. It is also necessary that the template 18 hold down tightly against the top sheet and conform, if necessary, to slight variations in the surface flatness of the stack 16 of paper or other material. Ordinary metal templates, such as brass, which are usually used with a frame, cannot exert the pressures required, even if the brass is previously coiled, or bent. For the purposes of the instant invention, the material from which the template 18 is made is 0.0125 inch thick steel, thus providing the necessary rigidity and magnetic properties. For increasing the life of the template 18, it is very desirable that at least the surface opposite the stack (upper) thereof be coated, or plated, with a material having reflectivity (to reflect the laser beam in the solid areas) and smoothness (to facilitate removal of the template from the paper after cutting, with a minimum of adhension.) For this purpose, at least one surface can be coated with either chromium, nickle, brass, tin, silver or copper. It has been found that without this coating, bare steel templates are destroyed after about two or three uses. With this coating, very long lifetimes are possible. For producing the template 18, conventional etching processes are employed. The steel sheet (with chromium coating) is coated with photo-resist layers, and etched in a ferric chloride solution to produce a desired pattern 20, which would ultimately be the image formed in the stack 16.

By way of example, the stack 16 of paper or other material includes 10 sheets of paper, each sheet having a typical thickness of 0.004 inch, the entire stack measuring 0.04 inch in height. Essentially, with the parts as assembled as shown in FIG. 2, the distance between the upper surface of the array of magnets 12 and the lower surface of the template 18 with the stack 16 therebetween will be approximately 0.05 inch. This distance is well within the desired parameters for the exemplary materials described for producing a fringing magnetic field at 0.03 inch to 0.30 inch above the surface of the magnets 12.

To vaporize through a single sheet of paper, it takes approximately 250 watt-seconds of energy per square inch at the surface. Therefore, in the instant example, the 10-sheet stack 16 of paper will be vaporized when approixmately 2500 watt seconds of energy from the laser beam 24 has been deposited per square inch over the surface in an overlapping scan. While details are not illustrated for providing the scan, conventional techniques may be employed such as a raster type scan, or a circular overlapping scan.

Utilizing the materials and configurations above-described, it has been found that substantial pressures can be exerted by the magnetic fields on the template 18, with the pressure being generally uniform over the surface of the stack 16 of paper. The magnetic pull on the template 18 exerted by the magnets 12 on the steel plate 10 approximates one-quarter pounds per square inch, which is sufficient not only to compress any voids between adjacent sheets of paper in the stack 16, but also to eliminate voids between the template 18 and the paper, and even to deform the template 18 to conform to variations in the thickness of individual sheets or layers of the material in the stack 16. In this regard, with the thickness selected for the template 18, any greater thickness would have made the template too rigid to allow it to bend slightly under the magnetic field. Therefore, it would not have eliminated voids as well, by being unable to easily conform to the surface of the paper. On the other hand, if the template 18 had been substantially thinner, the force exerted by the magnets 12 through the template 18 would be significantly reduced, thereby also producing a less desirable result.

The assembly thus described, with reference to a particular stack 16, of a particular material (i.e., paper) of a given number of sheets of a given thickness, has been found to prevent smoke residue from coating all the layers of paper, while eliminating voids between the layers of paper, to effectively prevent the paper from losing moisture content during the cutting process. This, in turn, greatly reduces any dimensional changes which one encounters in attempting to laser engrave a stack of paper using the brass template and frame.

While the description heretofore has described a particular set of materials, configurations, and parameters, it is to be understood that other modifications may be readily made to accommodate different materials or thicknesses. Although the magnetic field herein has been created by permanent magnets of ceramic material other means may be utilized to produce the magnetic field. For example, the magnetic field may be created as potted layer of a composition having magnetic particles therein, provided the appropriate field is realized for the particular application. Electromagnetic devices may be employed to provide magnetic fields which can be selectively varied for differing applications, with the same hardware, to produce the same field at the template regardless of thickness of the stack 16. Similarly, the thickness of the template 18 is by way of example, for the paper stack 16 described. For other materials, or different thickness of the stack 16, it may be correspondingly desirable to deviate from this thickness to achieve the desired pressure and results. The various parameters may be readily determined by experimentation.

When using the apparatus hereinabove described for other materials, such as cloth, the desired end product, and the characteristics of the material to application of heat must be taken into consideration. For example, certain polyester materials are woven from a synthetic thread material which has the tendency to fuse at the point of application of heat. When two or more layers are stacked, there is a tendency for adjacent layers to fuse together, or weld, along the cut edge. In other fabrics made of natural fiber, such as cotton or silk, this tendency does not manifest itself so readily. Plastic films likewise have a tendency to fuse at the cut edge. Polyester cloths, as well as natural fibers have a bias, or grain to the material, while plastic film does not.

Each of the characteristics, and the advantage or disadvantage of the characteristic is taken into consideration during the cutting or engraving process. If one wishes to cut synthetic materials, such as polyester cloth, there is some tendency for the laser beam to melt the cut thread ends so that the cloth does not tend to unravel. However, a single layer is considerably reduced in strength around the areas cut with the laser, since it is not too difficult to break the bond along the melted thread ends.

Figure 3:
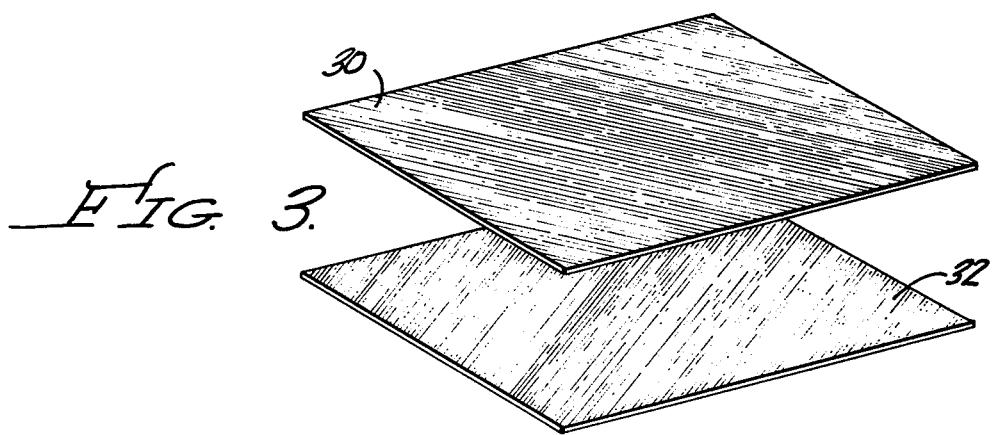
FIG. 3 is a perspective view of two sheets of material in overlapping, angular grain orientation for use with the apparatus of FIGS. 1 and 2.

This problem can be greatly minimized if, by reference to FIG. 3, two layers of polyester cloth 30 and 32 are positioned one above the other with the thread directions (shown in broken lines) angularly oriented relative to each other, for example at an angle of 45 degrees relative to each other. Although not shown, three layers may be superimposed on each other with the "grain" or direction of thread orientation of adjacent layers oriented at 30 degrees relative to the adjacent layer. If desired, prior to cutting, the layers may be bonded together, or laminated.

When this laminated arrangement is laser engraved, using the apparatus herein described, the magnetically attracted template 18 applies pressure to the multiple layers of cloth 30 and 32, bringing them into intimate contact with each other, so that when the layers are cut by the laser beam 24, the cut edge of the two (or more) layers of cloth 30 and 32 fuse, or melt together, thus welding the layers of cloth together along the cut edge. This increases the strength of the cut edge of the cloth since, the melted edge is larger; the extra layer(or layers) of cloth increases the strength of the end-product; and the orientation of the threads of the two (or more) layers eliminates a major weakness in cloth, which is, that the strength of the cloth, along the cut edge, is reduced when forces are applied, to a single layer, in a direction at 45 degrees to the direction of the thread. For use in the garment industry, laser cutting may be conveniently employed, using the techniques herein described. The apparatus and method of multiple layers need not be used for the entire garment, but for certain portions requiring the structural strength otainable, preferably with the extra layer (or layers) on the inside of the garment.

Plastic films exhibit the same "fusing" characteristics, and may readily be cut in abutting layers to form a weld along the cut edge. Alternatively, if it is desired to avoid the welding between adjacent layers, or between adjacent multiple-sheet layers, paper may be conveniently positioned in the intervening spaces to prevent welding of adjacent layers, as desired, within the stack. Thin sheets of paper, or other suitable non-fusible material placed between adjacent layers to prevent welding, may be used with either the polyester cloths, or with the plastic films previously discussed. After the stack is built up in the desired manner, the template 18 is positioned and the laser beam 24 energized and scanned. The applied pressure substantially eliminates the voids between adjacent materials, with the flexing of the template 18 due to the magnetic field conforming to the adjacent surface of the stack 16.

In applications using a stack of material other than paper, or having sheets of paper interleaved between cloth or plastic or the like, the apparatus described may be readily employed, although variations in laser intensity may be required to accommodate the vaporization requirements for the different materials in the stack 16, such variations being within the skill in the art. While there has been shown and described a preferred embodiment, it is to be understood that various other modifications made be made without departing from the spirit and scope of the invention.

I claim:

1. In an apparatus for laser cutting of a stack of relatively thin sheets of material in aligned stacked relation, the combination comprising:
   means for supporting the stack of sheets;
   means for providing a magnetic field; and
   template means formed of a magnetic material for placing on top of said stack, the magnetic forces of said magnetic field acting on said template means thereby urging adjacent sheets of material into intimate engagement with sufficient pressure for substantially eliminating penetration of laser beam generated vapors into spaces between said sheets of material.

2. The combination according to claim 1 wherein said template means has at least one surface comprised of a laser light reflective substance.

3. The combination according to claim 1 wherein said template means is formed from a sheet of generally rigid but slightly flexible material having at least a layer of material taken from the group consisting of chromium, nickel, copper, brass, silver and tin thereon at least the surface facing the laser beam.

4. The combination according to claim 3 wherein said template means is comprised of material taken from the group consisting of chromium, nickel, copper, brass, silver and tin.

5. The combination according to claim 1 wherein said means for supporting said stacks and said means for providing a magnetic field comprises a plate member formed of a magnetic material having an array of generally identical permanent magnets therein.

6. The combination according to claim 5 wherein said template is steel having at least one surface coated with a material taken from the group consisting of chromium, nickel, copper, brass, silver and tin.

7. The combination according to claim 5 wherein each of said magnets has the magnetic pole oriented perpendicularly to the plane of said plate member, with adjacent magnets having the poles oriented in opposite directions.

8. The combination according to claim 1 wherein said support means has a generally planar surface and is positioned between the stack and said means for providing a magnetic field.

9. The combination according to claim 8 wherein said support means is a sheet of nonmagnetic material.

10. The combination according to claim 2 wherein said template means is formed of steel and said reflective substance is nickel.

11. In a method for laser cutting of sheets of material of a smoke-sensitive nature, such as paper, cloth or the like, the method comprising:
    providing means for generating a magnetic field;
    providing a support assembly;
    stacking sheets of said material on said support assembly in generally aligned relation;
    placing a template formed of a magnetic material on said stack; and
    scanning the template with a laser beam having sufficient energy to vaporize the material exposed to the laser beam through the template, said magnetic field acting on said template to compress adjacent sheets of said material to prevent penetration of laser beam generated vapors into spaces between said sheets of material.

12. The combination according to claim 11 wherein the steps of providing a magnetic field and of providing a support assembly includes providing a support plate formed of a magnetic material, and combining an array of permanent magnets with said support plate for creating the magnetic field.

13. The combination according to claim 11 wherein the smoke-sensitive material is a polyester cloth material and said method further includes stacking of at least two adjacent sheets of such material with the thread orientations thereof in angular relation.

14. The combination according to claim 13 wherein the angular orientation is at an angle of substantially forty-five degrees.

15. The combination according to claim 11 wherein the sheets of smoke-sensitive material have fusible characteristics, and said method further includes the step of positioning a non-fusible material between adjacent sheets of the smoke-sensitive material during the step of stacking thereby to prevent welding of said adjacent sheets.

* * * * *